Patented Oct. 29, 1935

2,018,816

UNITED STATES PATENT OFFICE 2,018,816

SOFT GLASS COMPOSITION OF HIGH ELECTRICAL RESISTANCE

William C. Taylor, Corning, N. Y., assignor to Corning Glass Works, Corning, N. Y., a corporation of New York No Drawing. Application October 23, 1933, Serial No. 694,888

7 Claims. (Cl. 106—36.1)

My invention has for its object to provide a new and useful glass having certain special characteristics fitting it for use as a material from which to make stems and flares of electric lamps.

The methods employed in the manufacture of these parts and the conditions under which they operate render the possession of the special characteristics highly valuable, and while the desirability of such characteristics has long been known and much research has been expended in connection therewith no glass has heretofore been devised combining the desired characteristics to the extent that does the glass herein claimed.

The desired characteristics are:

A thermal coefficient of expansion of approximately .000009.

An electrical resistivity at a temperature of 350° C. of at least 180 x $10^6$ ohms per cm. cube, and preferably a higher resistance, say 224 x $10^6$.

A low softening point, i. e., 631° C., or less, the softening point being that temperature at which a thread of glass one millimeter in diameter and twenty-three centimeters long will elongate at the rate of one millimeter per minute when heated over the upper nine centimeters of its length.

A low specific gravity.

Any and all of these properties may easily be obtained at the sacrifice of others. The problem solved by me has been to obtain them all in one glass.

I have discovered that the presence of boric oxide and fluorine in lead glasses, in the ratio of one or more parts of boric oxide to one part of fluorine, produces an unexpected result in that it so softens the glass and increases the electrical resistance thereof without appreciably affecting the expansion coefficient or the specific gravity that other constituents such as the alkali oxides and lead oxide which have an effect on expansion, specific gravity, and other properties may be added or deducted to bring such properties to the most desirable values without losing the full benefit of the improved softness and resistance which is due to the boric oxide and fluorine. Such an effect is unusual since all prior methods of softening the glass have resulted in a lowering of the electrical resistance or a raising of the specific gravity. Neither boric oxide alone nor fluorine alone will accomplish this result since boric oxide of itself does not produce sufficient softening and fluorine alone causes opalescence in such glasses. I have found that the best results are obtained when the boric oxide and fluorine are present in substantially equal proportions or when the boric oxide is somewhat in excess of the fluorine. Unsatisfactory results are obtained when the fluorine is in excess of the boric oxide. To some extent barium oxide and calcium oxide may be substituted for lead oxide and such substitution results in a lowering of the specific gravity without seriously affecting the other properties. I have further found that a small amount of lithia introduced into my glasses in addition to the boric oxide and fluorine result in a further lowering of the softening point with no appreciable decrease in electrical resistance. This effect of lithia in maintaining a high electrical resistance in lead glasses is described and claimed by me in a separate application Serial Number 694,889, filed October 23, 1933, and I herein claim lithia for this purpose only when used in conjunction with boric oxide and fluorine.

The following glass compositions calculated from their respective batches which I have melted will further illustrate my invention:

|  | A | B | C |
|---|---|---|---|
| $SiO_2$ | 53.1 | 48.5 | 56.0 |
| $PbO$ | 20.7 | 35.0 | 20.3 |
| $K_2O$ | 9.4 | 6.9 | 8.0 |
| $Na_2O$ | 3.6 | 4.2 | 4.7 |
| $Li_2O$ | | | .1 |
| $BaO$ | 7.5 | | 6.3 |
| $CaO$ | | | 1.3 |
| $Al_2O_3$ | .6 | | .8 |
| $B_2O_3$ | 2.6 | 2.7 | 1.5 |
| $F$ | 2.5 | 2.6 | 1.0 |
| Resistance in ohms per cm. cube at 350° C. | 224 x $10^6$ | 182 x $10^6$ | 180 x $10^6$ |
| Softening point | 615° C. | 580° C. | 631° C. |
| Specific gravity | 3.026 | 3.267 | 3.012 |

It will be noted that the electrical resistance of all of the above glasses is considerably higher than that of prior glasses while the softening points have been kept relatively low and in the case of glasses A and B are actually lower than prior softening points. Moreover, the specific gravities have not been increased to any objectionable extent when considered in connection with the resistances and softening points. Other properties of the above glasses such as coefficient of thermal expansion, viscosity, annealing point, strain point, etc., are within the limits required for such glasses. The cost of my new glasses is no greater than that of prior glasses with the following exception: lithia, when used in the form of the carbonate or other refined compound of lithium, is expensive and an increase in lithia content rapidly increases the cost. In the case of a small lithia content such as is illustrated by glass C, lepidolite or other cheap lithium ores may be used without substantially increasing the cost.

What I claim is:

1. A glass of high electrical resistance which contains lead oxide and which also contains boric oxide and fluorine in combined amount not greater than 6% nor less than 1%, the boric oxide content being at least as great as the fluorine content.

2. A glass of high electrical resistance which contains at least 15% of lead oxide and which also contains boric oxide and fluorine in combined amount not greater than 6% nor less than 1%, the boric oxide content being at least as great as the fluorine content and containing also not less than 1% of an alkaline earth oxide.

3. A glass of high electrical resistance which contains at least 15% of lead oxide and which also contains boric oxide and fluorine and lithia, the boric oxide content being at least as great as the fluorine content.

4. A glass of high electrical resistance which contains at least 15% of lead oxide and which also contains boric oxide and fluorine in combined amount not greater than 6%, the boric oxide content being at least as great as the fluorine content and containing lithia.

5. A glass of high electrical resistance which contains at least 15% of lead oxide and which also contains boric oxide and fluorine in combined amount not greater than 6%, the boric oxide content being at least as great as the fluorine content and containing an alkaline earth oxide and lithia.

6. A glass of high electrical resistance which contains from 48 to 60% of silica, 15 to 35% of lead oxide, 10 to 14% of alkali oxides, 2 to 6% of boric oxide and fluorine, the boric oxide content being at least as great as the fluorine content.

7. A glass of high electrical resistance which contains from 48 to 60% of silica, 15 to 35% of lead oxide, 10 to 14% of alkali oxides, 2 to 6% of boric oxide and fluorine, the boric oxide content being greater than the fluorine content.

WILLIAM C. TAYLOR.